Sept. 27, 1966  A. M. HAND  3,275,298
DEMOUNTABLE CONTAINERS PROVIDED WITH JACK LEGS
FOR RAISING AND LOWERING THE SAME
Filed June 22, 1964  3 Sheets-Sheet 1

INVENTOR
Albert M. Hand
By
Brangley, Baird, Clayton,
Miller & Vogel,
Attys.

INVENTOR
Albert M. Hand

INVENTOR
Albert M. Hand

United States Patent Office 3,275,298
Patented Sept. 27, 1966

3,275,298
DEMOUNTABLE CONTAINERS PROVIDED WITH JACK LEGS FOR RAISING AND LOWERING THE SAME
Albert M. Hand, Etobicoke, Ontario, Canada, assignor, by mesne assignments, to Steadman Industries Limited, Cooksville, Ontario, Canada
Filed June 22, 1964, Ser. No. 376,726
10 Claims. (Cl. 254—45)

The present invention relates to heavy duty devices for raising, supporting and lowering heavy, bulky bodies such as truck bodies or freight containers which are demountable from their respective chassis and which require to be moved bodily between relatively low and relatively high elevations and to be supported at levels between said elevations.

To derive maximum benefit from a demountable freight container as herein visualized it is often necessary or desirable to leave such container in a demounted condition for an extended period of time either on stand-by or to permit loading or unloading thereof after which it may be retrieved by a vehicle for transporting to another site. While thus demounted, the container may be propped at any of a variety of elevations and its elevation may also often require to be varied, for example to permit it to be mounted on and/or demounted from the transporting vehicle.

The raising and lowering of the container from one elevation to another was heretofore commonly effected by jacking devices having feet which rested on the ground and, obviously, after the jacking devices had been used they were capable of being left in position to serve as legs or props for the container for a longer or shorter period of time until alternative support was provided as by a vehicle. In the past, however, it has generally been found desirable for many reasons which need not be enumerated herein to replace the jacking devices by simple propping legs after the former had been used to move the container to the desired level, whereby the relatively complex and expensive jack legs were freed for use in conjunction with other containers, although naturally it was necessary to use the jacking devices again for changing the level of the container when it was relocated on a vehicle.

Propping legs used for this purpose have usually consisted of a vertical standard disposable adjacent to the container mounting a vertically adjustable support with a cantilevered portion extending laterally therefrom for engagement with the container, said support being selectively securable in a plurality of vertically spaced locations on said standard for supporting a container at different elevations.

To the extent that they were also equipped with standards and container supports, prior jacking devices for demountable containers were generally similar to the propping legs described above. Essentially, however, they were primarily constructed for raising and lowering the container support relative to the standard while the said support was engaged with the container. Since in some cases a jacking device may be required to move a container between ground level and an elevation of say 60 inches above ground, it will be realized that the elevator means incorporated therein for raising and lowering the container contributed substantially to the complexity, weight and overall cost of the jacking device.

It is, of course, one general object of the invention to provide the combination of a container and legs for propping the container having means accommodating an elevator whereby the same legs may serve to raise and/or lower the container for the purposes aforesaid.

It is a further general object of the invention to provide a jack leg for a container as aforesaid which is inherently designed and constructed for use as a basic prop or leg for the container but which is equipped with facilities permitting readily removable installation thereon of an elevating device converting said leg into a jack adapted to raise or lower the container to the desired elevation after which the elevator may be removed restoring said jack leg to its former status as a basic leg.

It is a related object of the invention to provide a jack leg which is of sturdy but relatively lightweight construction affording stable support for a heavy, bulky body such as a demountable freight container while not precluding ready handling of the leg, said jack leg being reliable in use and economical to manufacture.

It is a more specific object of the invention to provide a jack leg which is capable of raising and lowering a heavy, bulky body, said jack leg including a support engageable with such a body, and vertically movable to raise or lower said body in at least two stages.

It is a further object of the invention to provide a jack leg as aforesaid wherein vertical movement of said support is procured by an elevator releasably engaged therewith.

It is a further object of the invention to provide a jack leg as aforesaid wherein said elevator is a fluid-operated cylinder of relatively short but powerful stroke, said support being movable through each said stage by one substantially full stroke of said cylinder.

It is a further object of the invention to provide a jack leg as aforesaid wherein said support is securable against downward movement when said elevator is disengaged therefrom.

It is a further object of the invention to provide a jack leg as aforesaid with a support including means for effecting releasable engagement with said elevator at any one of a plurality of positions vertically spaced on said support.

It is a further object of the invention to provide a jack leg as aforesaid having a reaction base for bracing said elevator; said reaction base being vertically adjustable between a low station adjacent to the foot of the jack leg and at least one station above the low station whereby said elevaor may be braced at either of said stations.

It is a further object of the invention to provide a jack leg having a support capable of a relatively long range of vertical movement and which in operation may be lowered to a position adjacent the foot of the jack leg to deposit a body supported thereby on the ground.

It is a still further object of the invention to provide means in a jack leg as aforesaid for holding said elevator securely in place on said leg during actuation of said elevator.

The above and other objects are achieved in accordance with the invention by the provision of a jack leg comprising a standard disposable adjacent to a body to be raised, propped or lowered and a support vertically movable between upper and lower levels on said standard and engageable with said body for movement conjointly therewith. A stop is provided which is releasably fixable to the standard to arrest downward movement of the support at various selected levels on said standard and thereby to enable the support and standard jointly to sustain the weight of the body and act as a prop therefor. The leg also includes a reaction base spaced from said support, and connections are provided enabling installation between said support and said reaction base of a demountable elevator operable to raise said support towards said upper level and to regulate the descent of said support towards said lower level, the weight of the body being transferred from the standard to the elevator during operation of the latter as aforesaid. It is preferred that the elevator be a fluid-operated cylinder, such as a hydraulic cylinder, which may be of a standard type readily available in the industry and which, when used with the jack leg contemplated by the invention, possesses numerous advantages some of which will be obvious and some of which will become apparent from the ensuing detailed description of the embodiments shown in the drawings.

Two preferred embodiments of the invention illustrating the elements, parts and principles thereof will now be described, solely by way of example, with reference to the accompanying drawings wherein.

Figures 7, 8, 9, 10:
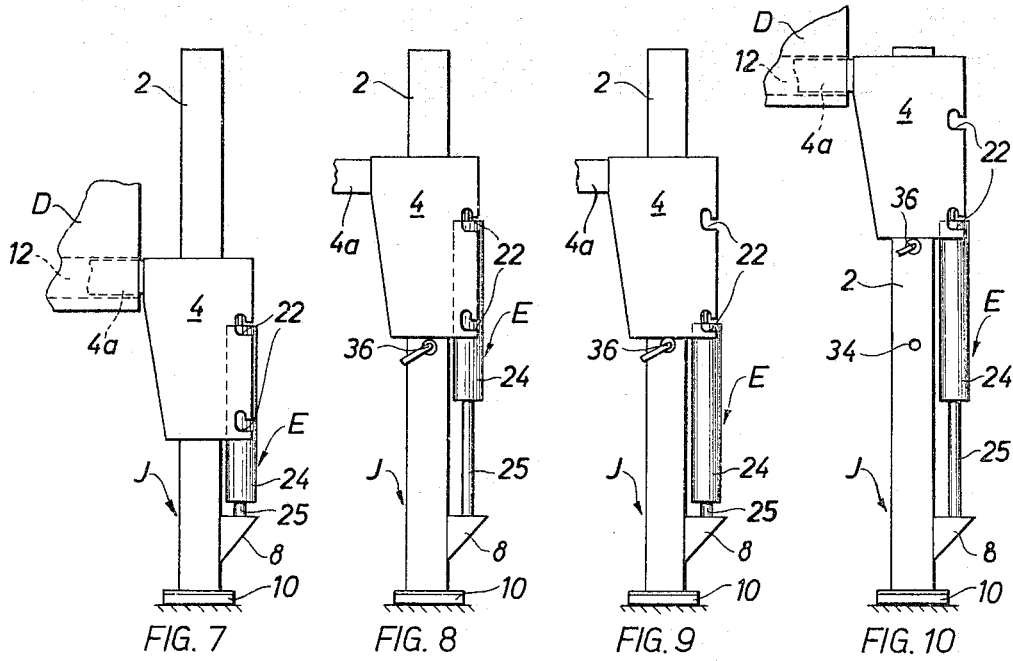
FIGS. 7–10 are diagrammatic views illustrating one method of operating the jack leg of FIG. 2.
Figure 15:
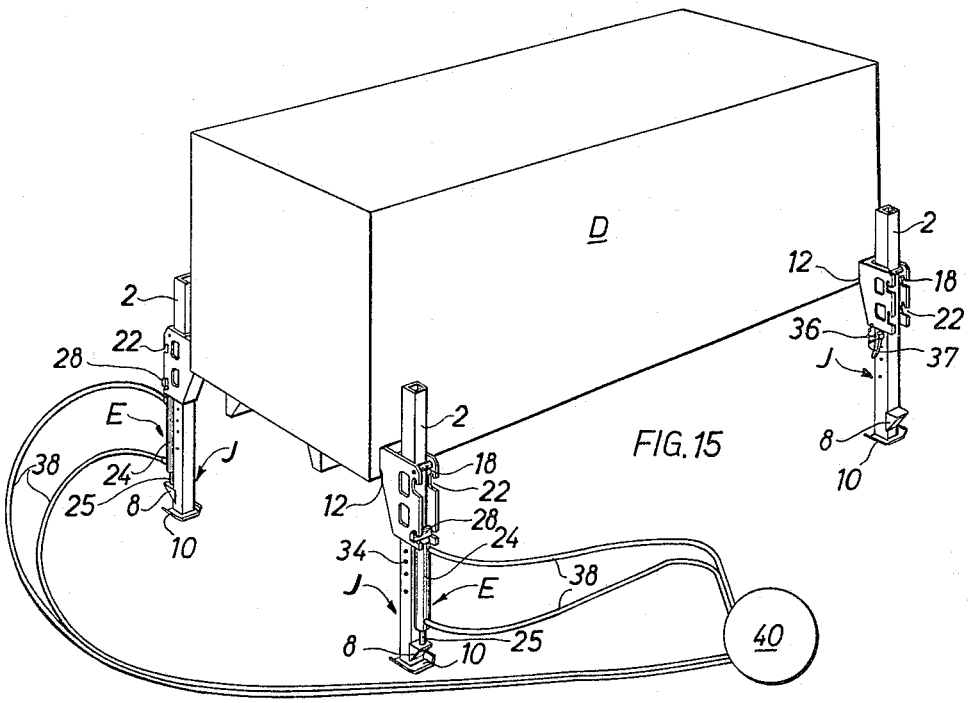
FIG. 15 is a perspective view of a demountable freight container supported by a set of jack legs of the type shown in FIG. 2.

The jack or jack leg J of the invention is comprised of the basic leg represented by a standard 2 adapted to stand erectly adjacent a body such as the container D, best illustrated in FIG. 15 of the drawing, which requires to be raised and/or lowered and/or propped as explained previously herein. Said standard 2 mounts a support 4 which is vertically movable thereon between a lower limit as represented, for example by FIG. 11 and an upper limit as represented by FIG. 10.

In the present embodiment of the invention said support 4 engages container D by means of the cantilever extension or arm 4a which releasably engages a corresponding element on container D to be described later on in greater detail; said container D being thereby coupled to the support 4 and rendered co-movable therewith on standard 2.

To prop container D at a desired elevation, the invention contemplates a stop device for the support 4, one possible form of which device will be more particularly described in due course.

As illustrated in FIG. 15, a container D brought to the required elevation may be propped at that elevation by means of legs J substantially as indicated particularly at the right hand side of this view.

Figures 11, 12, 13, 14:
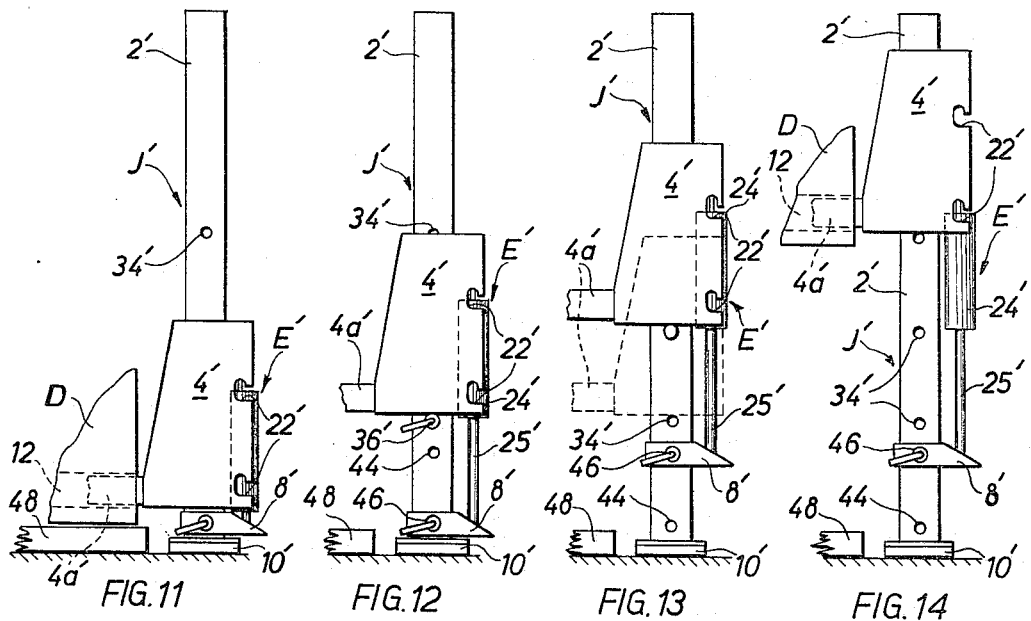
FIGS. 11–14 are diagrammatic views illustrating one method of operating the jack leg of FIG. 3.

As has been explained, however, the invention is concerned with the fact that the instant container D may require to be propped at a variety of elevations and will resultantly require to be moved between those elevations within the limits indicated by the exemplary FIGS. 10 and 11.

To facilitate such movement the invention contemplates the provision of facilities on said leg J enabling an elevator E having axially spaced and aligned terminals to be installed thereon between said support 4 and a reaction base 8 stationed, in this embodiment, adjacent the foot 10 of standard 2, said support and reaction base being respectively engageable by said terminals as will appear hereinafter.

The elevator E contemplated by the invention may take several forms; the form selected for the purposes of this disclosure being the familiar pump or cylinder which has features of particular advantage to the present invention and is operable by hydraulic or pneumatic pressure to apply an upward thrust to support 4 while braced on said reaction base 8.

Figure 16:
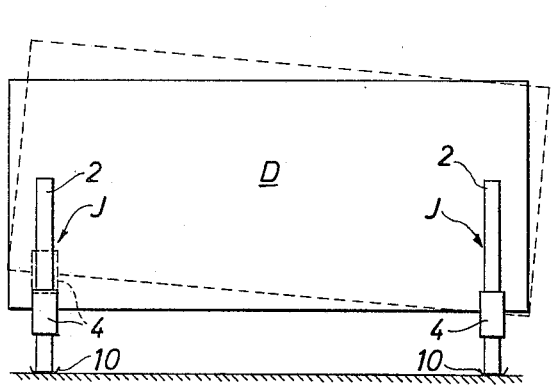
FIGS. 16–18 are diagrammatic views illustrating one method of raising the freight container of FIG. 15 by means of the jack legs of the invention.
Figure 17:
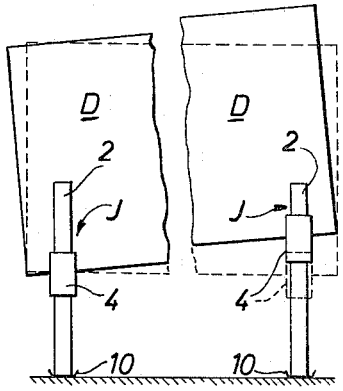

According to the inventive idea said elevator E may be installed on a leg J to raise the support 4 and container D on said standard 2 substantially as in FIGS. 16 or 17. When a desired level has been attained the stop device is then operated to arrest the support 4 and container D and to prevent downward movement thereof below the said level after which the elevator E may be removed for use at another site, if desired.

Obviously the left hand corner of container D in FIG. 16 may be lowered from its dotted line to its full line position by a simple reversal of the raising procedure above described. That is to say, the elevator E may be installed on leg J while downward movement of support 4 and container D is arrested, after which said stop device may be released to transfer the weight of container D from standard 2 to elevator E; the latter being then operated to permit controlled lowering of container D to its new position at which it may be re-arrested by said stop device.

Figure 2:
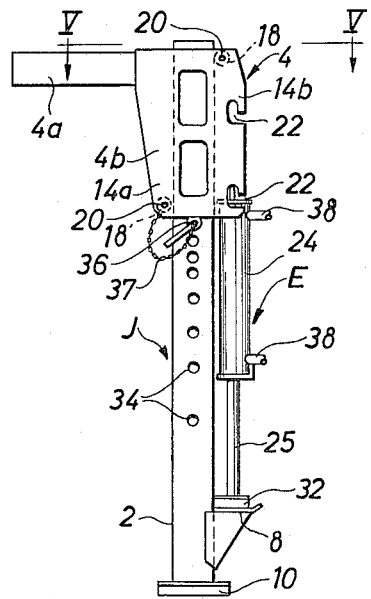
FIG. 2 is a side elevation of a jack leg in accordance with the invention with an elevator in operative position thereon.

In greater detail the jack leg J constructed in accordance with the invention is illustrated in FIG. 2 while FIG. 15 shows how an assembly of such legs may be used in raising, lowering or propping a heavy body such as the demountable freight container D.

As shown and previously stated the jack leg J includes standard 2 and support 4 vertically movable thereon. The elevator E acts between the support 4 and the reaction base 8 secured to the standard 2 to procure vertical movement of the support 4 relative to the standard 2. Foot 10 of standard 2 rests upon the ground or other unyielding surface underlying the body to be raised and the support 4 is engaged with said body as has been explained.

To permit the engagement aforesaid housings 12 are provided in the container D adjacent the four corners thereof for the reception of extensions or arms 4a forming part of the supports 4. Each extension 4a is mounted on a carriage 4b; said extension 4a and said carriage 4b jointly consisting the support 4.

Figure 1:
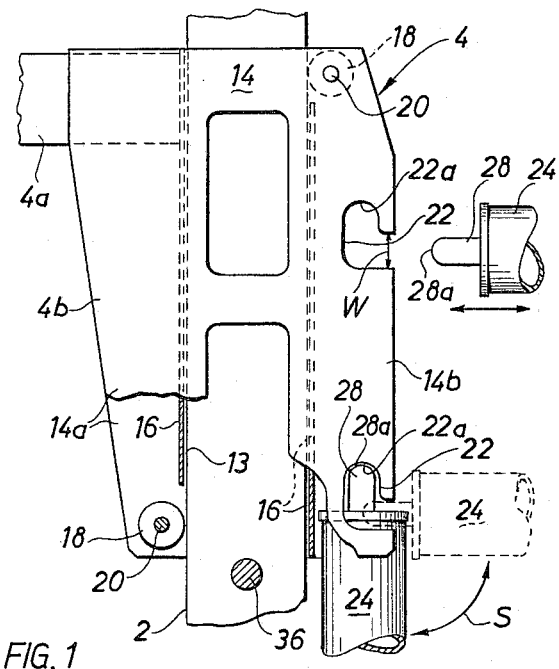
FIG. 1 is a fragmentary view, partly broken away, showing part of a jack leg in accordance with the invention and illustrating how an elevator may be installed thereon.
Figure 5:
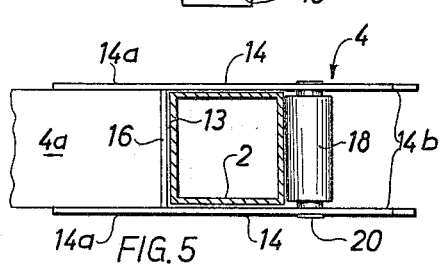
FIG. 5 is a section on the line V—V of FIG. 2 but with the elevator omitted.

The carriage 4b has an axial passage 13 therethrough defined by two pairs of walls 14 and 16, the walls 16 stopping short of the ends of the passage 13 at their upper and lower extremities respectively to accommodate a pair of rollers 18 rotatable on spindles 20 mounted between the walls 14. The standard 2 extends through the axial passage 13 and is engaged at opposite sides by the rollers 18 as shown in FIGS. 1 and 5. The carriage 4b is movable up and down the standard 2 and it will be obvious that when the extension 4a is under load from a body to be raised or lowered the rollers 18 bear on opposite sides of the standard 2 and thereby minimise the friction between the carriage 4b and the standard 2. Owing to the reduced friction it is possible to construct the standard 2 from relatively lightweight material such as aluminum-alloy, which would otherwise be unsuitable by reason of its rapid wearing properties, and thereby enhance the portability of the leg J as a whole. As shown in FIG. 5, in the presently preferred embodiment the standard 2 and the passage 5 are of rectangular cross-section.

On a closer inspection of FIG. 1 it will be seen that the walls 14 of the carriage 4b extend beyond the walls 16 to form two pairs of flanges 14a and 14b. The flanges 14a carry one of the spindles 20 and also serve as buttresses for the extension 4a. Then flanges 14b carry the other spindle 20 and also carry two pairs of vertically spaced connections 22 disengageably engageable with the elevator E to accommodate installation of the elevator at different vertical positions relative to the support 4. The connections 22 may be registering pairs of L-shaped slots, as shown, having horizontal branches extending inwards from the edges of the flanges 14b and vertical branches extending upwards from said horizontal branches and terminating in closed ends 22a.

Figure 4:
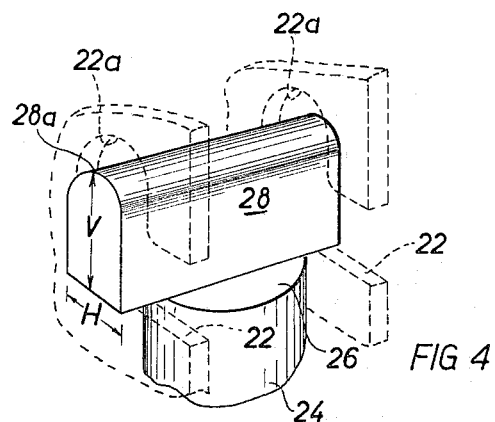
FIG. 4 is a fragmentary view showing one end of an elevator for use with the jack leg of the invention, part of the jack leg being indicated in broken lines.
Figure 6:
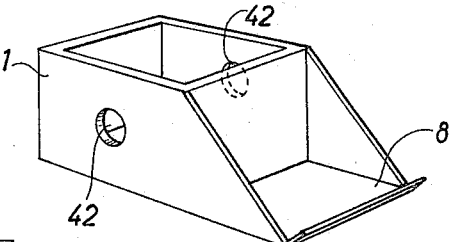
FIG. 6 is an enlarged scale, detail view of a reaction base forming part of the jack leg of FIG. 3.

The elevator E preferably comprises a hydraulic cylinder 24 having a piston rod protruding therefrom and having a closed end 26. A head 28, FIG. 4, constituting one terminal of the elevator, is mounted on the closed end 26 and projects laterally on opposite sides of the hydraulic cylinder 24, the diameter of the cylinder 24 being small enough to allow the cylinder to be positioned between the flanges 14b while the projecting portions of the head 28 engage in the connections 22, shown in broken line in FIG. 4, but large enough to prevent undue lateral movement of the cylinder 24 in a direction parallel to the head 28 which movement might result in the dislodgement of the head 28 from the connections 22.

The head 28 has a cross-section which is basically rectangular but which may be rounded or arcuate at one end 28a. As shown best in FIG. 4 the head 28 has a vertical dimension V and a horizontal dimension H. The connections 22 on the other hand have horizontal branches whose width W is less than the dimension V but greater than the dimension H. Thus to engage the head 28 in one of the pairs of connections 22 the elevator E must first be disposed horizontally (see upper part of FIG. 1) while the laterally projecting portions of the head are inserted in the horizontal branches of the connections. When the rounded end 28a of the head 28 reaches the junction of the horizontal and vertical branches, as shown in broken lines, FIG. 1, the elevator E may be swung downwards through approximately 90 degrees as suggested by the arrow S, FIG. 1, whereby the head 28 assumes the position shown in full lines in the lower part of FIG. 1 in which position the rounded end 28a of the head 28 can abut the closed ends 22a of the connections 22 when the elevator is under load and in which position also the head 28 cannot escape from the connections 22 because the head dimension V exceeds the connection dimension W. Obviously the head 28 is disengaged from the connections 22 by reversing the procedure outlined above.

To brace the lower end of the piston rod 25 (which constitutes the other terminal of the elevator) during operation of the elevator E the reaction base 8 is provided which may take the form of a bracket secured to the standard 2, said bracket being flanged at 32 to prevent lateral slipping of the piston rod 25 when the elevator is under load and to form, as it is were, an additional connection for the elevator E. As will be apparent from the drawings the connection thus provided is aligned with the connections 22 carried by the support 4 and is spaced therefrom in a vertical direction.

The standard 2 is preferably further provided with facilities, such as a series of vertically spaced transverse holes 34, by which the stop device previously mentioned herein is releasably fixable at selected levels thereon. Said stop device may take the form of a pin 36 insertable in the holes 34. To prevent loss the pin 36 may be attached to the carriage 4b by a chain 37.

Attention is now directed to FIGS. 7 to 10 which show schematically and progressively how the jack leg J of the invention may be used to elevate a freight container D from a relatively low level to a relatively high level.

In FIG. 7 the jack leg J is shown erectly disposed adjacent the container D with the foot 10 on the ground and with the support extension 4a engaged in a housing 12 at one corner of the container D. At this point, the container bottom may, for example, be 36 inches from the ground, more or less.

As will be appreciated the present elevator E performs its function by linear expansion and contraction; said expansion being effected by the introduction of fluid into said cylinder 24 to extrude the piston rod 25 therefrom and said contraction being effected by reversal of the fluid flow to permit retraction of the piston rod 25 within the cylinder 24.

The elevator E in its contracted condition is installed on the leg J by engaging the head 28 in the upper pair of connections 22 and positioning the lower end of the piston rod 25 on the reaction base 8. Fluid is then admitted to the elevator cylinder 24 to expand the elevator and, since the reaction base 8 is disposed at a fixed level relative to the standard 2, in consequence of the expansion the head 28 is moved vertically upwards; the support 4 and the freight container D engaged with said support 4 being moved upwards conjointly with the head 28.

When the elevator E has reached the limit of its stroke, that is to say when the piston rod 25 can be projected no further from the cylinder 24, the pin 36 is inserted in the transverse hole 34 immediately below the support 4, FIG. 8.

The elevator E is then collapsed, i.e. the piston rod 25 is retracted into the cylinder 24 as far as possible, and the head 28 is disengaged from the upper pair of connections 22 and subsequently engaged in the lower pair of connections 22, FIG. 9; the support 4 being arrested against substantial downward movement during such transfer by the pin 36 which projects laterally of the standard to serve as a stop for said support 4, although obviously the support will in most cases descend slightly before it is arrested by the pin 36.

It will be understood that, whereas during expansion of the elevator E the weight of the container D is sustained principally by the elevator E to which it is transmitted by the support 4, and also by that part of the standard 2 below the reaction base 8, after arrest of the support 4 by the pin 36 the load on said support is transferred to the pin and through it to the standard 2. For sake of brevity when the weight of the container D or other body is sustained by the elevator E whether during raising of the container as described above or during lowering thereof, the elevator is described herein as being "under load."

It should here be noted that the vertical spacing between the two pairs of connections 22 is relatively small, being substantially equal to the stroke of the elevator E. For the sake of convenience the term "stroke" is used herein to denote the travel of the piston rod 25 between collapsed and fully expanded positions of the elevator E, which may, for instance, be in the order of 12 inches.

With the piston rod 25 repositioned on the reaction base 8 the elevator E is re-expanded whereby the head 28 is again elevated and the support 4 and container D are raised to the level shown in FIG. 10, at which the base of the container D may, for example, be 60 inches above the ground.

It will be clear that the support 4 has been raised from its lower, FIG. 8 level to its upper, FIG. 10 level in two vertically consecutive steps or stages, being temporarily fixed at an intermediate level, FIGS. 8 and 9, while the elevator E is demounted from one position relative to the support 4 and relocated in another position relative thereto, and that each of said stages substantially corresponds to the stroke of the elevator E.

After being raised to its FIG. 10 level the support 4 may be restrained against downward movement by the pin 36 which is again inserted in the hole 34 immediately below the support 4, thus permitting the head 28 to be disengaged from the lower pair of connections 22 and allowing the elevator 6 to be removed from the jack leg J for use on another jack leg. Thereafter the jack leg J may function as a simple propping leg for supporting the container D while it is loaded or unloaded or on stand-by, the releasable mounting facilities for the elevator E permitting the leg to be used in this way without incurring the disadvantage of keeping a complete jacking device occupied in a non-jacking capacity for any appreciable length of time. A jack leg J serving a simple propping function with the elevator E removed is shown at the right hand end of FIG. 15.

Conversely, if the container D is to be mounted immediately on a vehicle chassis or other mounting means, the elevator E may hold the support 4 at the FIG. 10 level until said chassis or other means has been stationed beneath the container D whereupon the elevator E is contracted to deposit the container D thereon and to permit disengagement of the elevator E from the jack leg J and/or of the jack leg J from the container D.

The sequence for lowering is substantially the reverse of that for raising, although the support 4 must first be raised slightly to allow removal of the pin 36, if this has been inserted in the standard 2, or to allow withdrawal of a chassis or other support for the container D before the support 4 can be lowered. To regulate the descent speed of the support 4 and container D a flow control valve may be inserted in the hose line carrying the exhausted fluid from the hydraulic cylinder 24 during the lowering operation, said valve being adjustable to achieve a desired lowering speed.

As illustrated in FIG. 15 a pair of elevators E is connected by hoses 38 to a self-contained portable hydraulic power unit indicated schematically at 40, whereby the elevators E may be used first on a pair of jack legs J located at one end of a container D and then on a further pair of legs J at the opposite end of the container D. Alternatively the elevators E may be powered by a pump mounted on a truck chassis and driven by a power take-off.

To avoid the risk of the contents of the container D shifting during raising or lowering of the container D with consequent hazard to the stability of the assembly of the container and jack legs J it is preferable not to tilt the container D unduly during raising or lowering thereof and the multi-stage operation of the legs of the present invention is particularly advantageous in this respect. More explicitly when the jack legs J are used opposite ends of a container D may be raised or lowered alternatively through one stage at a time.

Figure 18:
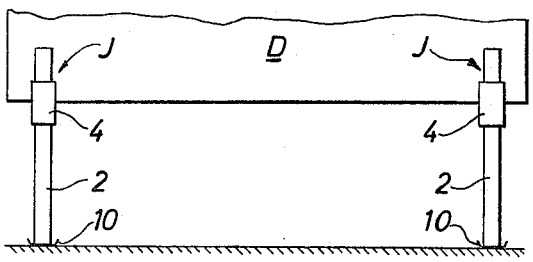

Thus in the foregoing example the total lift imparted to the container D is 24 inches and this may be achieved in the manner shown diagrammatically in FIGS. 16 to 18 wherein only sufficient of the legs J is shown to illustrate the progressive movement of the supports 4 up the standards 2. The container D is shown in full lines in FIG. 16 having four legs J engaged therewith, all said legs J being in the condition shown in FIG. 7 with their supports 4 at their lower limits of movement on the standard 2. When the left hand pair of legs is actuated to assume the FIG. 8 condition the left hand end of the container is elevated approximately 12 inches (broken line position of FIG. 16). The right hand pair of legs J is then actuated to assume the FIG. 8 condition whereby the container D is brought level again (broken line position of FIG. 17) and subsequently to assume the FIG. 10 condition, with their supports 4 at their upper limits of movement on the standards 2, whereby the right hand end of the container D is elevated approximately 12 inches above the left hand end as shown in full lines, FIG. 17. Finally the left hand pair of legs is brought into the FIG. 10 condition and the lifting of the container is complete, FIG. 18.

By this type of operation neither end of the container D is at any time disposed at a level more than 12 inches above or below that of the other end. It is, of course, possible to apply elevators E to each of four jack legs J and operate these elevators E in synchronism whereby the container D remains substantially horizontal at all times during raising and lowering; which method may be preferable where an exceptionally heavy container is to be raised and/or lowered.

Although a two-stage operation of the leg J by elevator E has been illustrated in FIGS. 7–10 and 16–18 obviously the use of the leg J in its jacking capacity is not restricted to this type of operation since in some circumstances it may be sufficient to raise the support 4 and container D through only one stage, as for example where the container D has to be raised off one chassis and deposited on another chassis of similar height. It will also be appreciated that whereas the jack leg J has been described as serving to raise a container D off one chassis and subsequently to deposit it on another, containers such as D may be raised from and deposited on other types of support by means of the jack leg of the invention, a chassis merely being one instance of suitable support for such containers.

Figure 3:
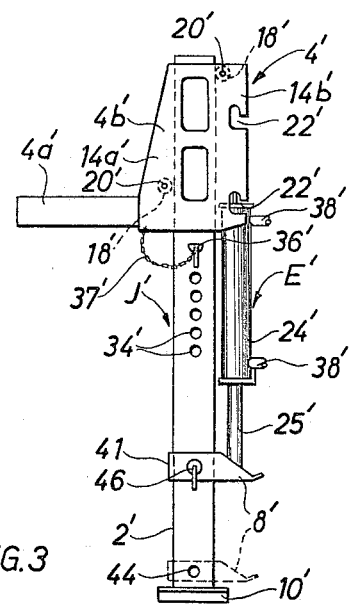
FIG. 3 is a side elevation of a modified form of jack leg in accordance with the invention with an elevator in operative position thereon.

A modified form of jack leg in accordance with the invention is designed J' in FIG. 3, and is specially adapted to effect lowering of a container D substantially to ground level and to raise it from such level.

The jack leg J' is similar to the leg J shown in FIG. 2, corresponding parts being indicated by primed reference numerals. The support 4', however, differs from the support 4 in that the extension 4a' is located at the lower end of the carriage 4b' for a reason which will appear. Moreover the leg J' includes a reaction base 8' which is vertically adjustable on the standard 2' between a station adjacent to the foot 10' and at least one station spaced above said foot, for bracing the elevator E' at either of said stations.

To permit such adjustment the reaction base 8' may be carried by a mount 41 which embraces the standard 2' and which has holes 42 therein at opposite sides thereof. Said holes 42 are registerable with corresponding holes 44 in the standard 2' and a pin 46 is insertable through both sets of holes to secure the reaction base 8' at said stations on the standard 2'. It will be clear that the reaction base 8' can thus be stationed in as many positions as there are holes 44 on the standard 2'. In the present instance there are two holes 44, of which one is adjacent to the foot 10' and the other is spaced vertically upwards therefrom a distance corresponding substantially to the stroke of the elevator E'.

As stated previously this embodiment is of particular use in lowering a container D to or raising it from ground level or a level close thereto and one exemplary mode of operation thereof will now be described with particular reference to FIGS. 11 to 14.

FIG. 11 shows a corner of a freigth container D resting on wood blocks such as 48 on the ground. The blocks 48 prevent the container base and any fitments thereon from being damaged by contact with the ground and also may be of assistance in that they elevate the container D slightly off the ground and render the housings 12 readily accessible for engagement with the arms or extensions 4a' when the latter are positioned adjacent to the reaction base 8' in its lower station as shown in FIG. 11. It will now be apparent that the extension 4a' is located at the lower end of of the carriage 4b' to permit its insertion in a housing 12 when the latter lies at a very low level.

The extension 4a' of a jack leg J' having been engaged in a housing 12 and elevator 6' in its collopsed condition is positioned with its head 28' engaged in the upper pair of connections 22' on the support 4' and with its piston rod 25' abutting the reaction base 8'. The elevator E' is then expanded to the limit of its stroke and the head 28' lifts the support 4' and container D to the level shown in FIG. 12, at which level it is held by means of the pin 36' while the elevator E' is collapsed and the reaction base 8' is shifted to its upper station in which it again abuts the piston rod 25' of the collapsed elevator E', FIG. 13 (broken line position of the support 4').

Thereafter the leg J' may be operated in the manner detailed above in connection with the leg J, the steps of said operation being illustrated in FIG. 13 (full line position of the support 4') and FIG. 14. In this way the container D is raised to the FIG. 14 level in three steps or stages.

Obviously, however, this is but one of several possible ways in which the leg J' can be used. For instance, it is possible to utilize the leg J' without shifting the reaction base 8' relative to the standard 2', the support 4' being raisable through two stages by the elevator E' with the reaction base 8' in either of the stations shown in FIGS. 12 and 13. It will be seen, therefore, that by vertue of the adjustable reaction base 8' the jack leg J' is considerably more versatile than the leg J of FIG. 2 while retaining the advantages of the leg J, particularly its ready convertability for use as a simple propping leg.

In summary the jack leg contemplated by the present invention comprises features enabling it to prop a heavy body at selected levels, specifically the support 4 or 4' the standard 2 or 2' and the stop pin 36 or 36', and also includes features permitting its ready conversion for operation in a jacking capacity, specifically the connections 22 or 22' and the reaction base 8 or 8' which facilitate installation of an elevator on the leg for powering upward movement and regulating downward movement of said support on said standard. Desirably the facilities for installing the elevator E or E' on the jack leg are so arranged as to enable multi-stage operation of the jack leg as herein described.

While two embodiments of the invention have been described in detail herein it is to be understood that these are for the purposes of illustration only and should not be interpreted in any limiting sense since many modifications of said embodiments will immediately suggest themselves to a person skilled in the art, the invention being deemed to comprehend all such modifications as fall within the scope of the claims now following.

What is claimed is:

1. A jack for raising and lowering a heavy body through a plurality of elevations comprising:
    a standard having a foot on which it is erectly disposable adjacent a body to be raised and lowered between upper and lower limits on said standard and to be propped at various levels between said limits;
    a support movable on said standard between said upper and lower limits having an extension releasably engageable with an element of said body co-acting with said extension to load the body on said support and render it co-movable therewith on said standard;
    a stop releasably fixable on said standard for arresting descent of said support at selected levels, the load on said support being thereby transferred to said stop and through it onto said standard for propping the body on said standard;
    an elevator having spaced terminals;
    a reaction base stationed on said standard between said foot and said support, and
    vertically spaced, aligned connections on said support and reaction base respectively engageable with said elevator terminals accommodating installation of said elevator on said standard between said support and said reaction base;
    said elevator being expandable to spread said terminals apart and, when installed as aforesaid, to initially engage said terminals with said connections for positioning said elevator on said standard and thereafter to raise said support from a level at which it is arrested by said stop to a higher level thereby unloading the said stop and transferring the load therefrom to said reaction base and through said reaction base to said standard;
    said elevator being thereafter also contractible for drawing said terminals together permitting regulated descent of said support on said standard until rearrested by said stop; the elevator being then further contractible for reloading said support on said stop permitting disengagement of said terminals from said connections and removal of said elevator from said standard;
    said stop being releasable from said standard when unloaded as aforesaid and being refixable to the standard at a new level to rearrest said support and prop said load on the standard at said new level.

2. A jack as claimed in claim 1 wherein:
    at least two of said connections are carried by said support and are vertically spaced from each other on said support, being selectively disengageably engageable with one terminal of said elevator to accommodate installation of said elevator at a plurality of vertical positions relative to said support;
    said stop being releasable from said standard when unloaded as aforesaid with the elevator installed at one of said vertical positions relative to said support and being refixable to said standard at a new level to rearrest said support at said new level and to permit removal of said elevator from said one vertical position relative to said support and relocation thereof at another of said vertical positions relative to the support;
    said vertically spaced connections on said support permitting operation of said elevator successively at each of said plurality of vertical positions to procure vertical movement of said support through a plurality of vertically consecutive stages.

3. A jack as claimed in claim 2 wherein, the spacing between said connections on said support substantially corresponds in extent to one of said vertically consecutive stages and each of said stages substantially corresponds to the stroke of said elevator.

4. A jack as claimed in claim 1 wherein,
    said reaction base is vertically adjustable relative to said standard between upper and lower stations permitting said elevator to be operated to procure vertical movement of said support on said standard with said reaction base at one of said stations and permitting said elevator subsequently to be operated to procure further vertical movement of said support on said standard with said reaction base at the other of said stations.

5. A jack as claimed in claim 1 wherein,
    said reaction base is vertically adjustable relative to said standard between a lower station adjacent to said foot and an upper station spaced above said foot, permitting said elevator to be operated to procure vertical movement of said support on said standard with said reaction base at one of said stations and permitting said elevator subsequently to be operated to procure further vertical movement of said support on said standard with said reaction base at the other of said stations.

6. A jack as claimed in claim 2 wherein,
    said reaction base is vertically adjustable relative to said standard between a lower station adjacent to said foot and an upper station spaced above said foot, permitting operation of said elevator successively at each of said plurality of vertical positions to procure vertical movement of said support through a plurality of vertically consecutive stages as aforesaid with said reaction base at either one of said stations.

7. A jack as claimed in claim 1 wherein,
    said support is movable on said standard through at least two vertically consecutive stages between said upper and lower limits, and
    said connections are disengageably engageable with said elevator to accommodate installation thereof in one position for operation to procure movement of said support through one of said stages, and in another position for operation to procure movement of said support through its other said stage,
    said stop being releasable from said standard as aforesaid when the elevator is installed in one of said positions and being refixable to said standard at a new level to rearrest of said support at said new level as aforesaid and to permit removal of said elevator from said one position and relocation thereof at the other of said positions.

8. A jack as claimed in claim 7 wherein,
said reaction base is vertically adjustable relative to said standard between a lower station adjacent to said foot and an upper station spaced above said foot, and
at least some of said connections are vertically spaced from each other on said support and are selectively disengageably engageable with said elevator to accommodate installation of said elevator in said positions for operation as aforesaid with said reaction base at either one of said stations,
said connections being disposed on said support to permit lowering of said support to a level adjacent to said foot when said reaction base is at said station adjacent to said foot and said elevator is on one of said positions.

9. A jack as claimed in claim 1 wherein,
said terminals and said connections are shaped to prevent disengagement of the one from the other when said elevator is under load and installed as aforesaid.

10. A jack as claimed in claim 1 wherein,
said elevator includes a hydraulic piston and cylinder arrangement; said terminals being carried respectively by said piston and said cylinder.

References Cited by the Examiner
UNITED STATES PATENTS

| | | | |
|---|---|---|---|
| 1,732,175 | 10/1929 | Thompson | 254—108 |
| 2,985,482 | 5/1961 | Lion | 254—45 X |
| 2,995,397 | 8/1961 | Eames | 214—515 X |

WILLIAM FELDMAN, *Primary Examiner.*

OTHELL M. SIMPSON, *Examiner.*